March 7, 1961  F. R. BACON ET AL  2,974,052
ULTRAVIOLET LIGHT ABSORBING GLASS
Filed July 11, 1960
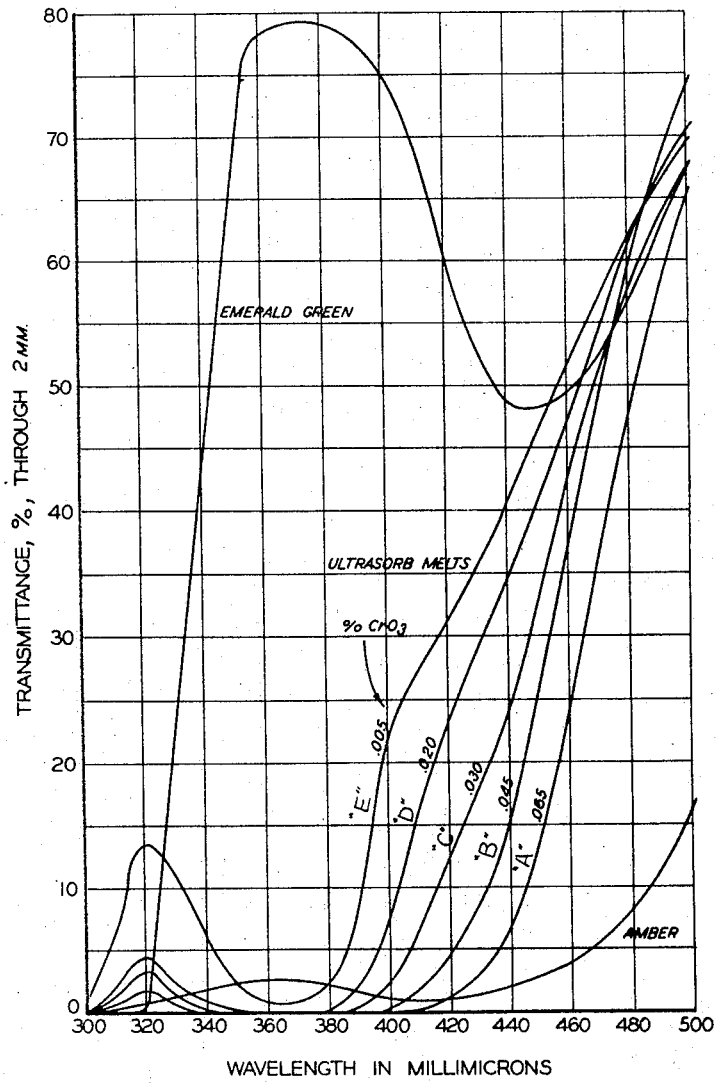
INVENTORS
F. R. BACON &
BY  C. J. BILLIAN REISSSUED
Oct. 8, 1963
Re. 25,456

United States Patent Office 2,974,052
Patented Mar. 7, 1961

2,974,052
ULTRAVIOLET LIGHT ABSORBING GLASS

Frank R. Bacon, Toledo, and Carroll J. Billian, Perrysburg, Ohio, assignors to Owens-Illinois Glass Company, a corporation of Ohio Filed July 11, 1960, Ser. No. 42,014

3 Claims. (Cl. 106—52)

The present invention relates to glasses which absorb ultraviolet radiation and short-wave radiation within the visible spectrum and more particularly to compositions of such glasses.

The invention is of utility in the manufacture of glass bottles, jars and other containers used for the packaging of food, beverage, and pharmaceutical products which are detrimentally affected by undesirable photochemical effects produced by such radiation.

In the case of comestible products marketed in glass bottles or other containers, the deterioration in the taste of beer, wine, ale and orange-flavored soft drinks, the development of rancidity in cooling oils and the loss of vitamin C content of milk are examples of such undesirable photochemical reactions. These reactions are caused by exposing the foodstuffs to ultraviolet radiation and also to some extent to short-wave radiation within the visible spectrum. The ultraviolet region of the electromagnetic spectrum is that region near the visible spectrum including wave lengths from 20 to 380 millimicrons which are longer than X-rays and shorter than visible light rays. Generally, the ultraviolet portion of the spectrum is termed anything below 400 millimicrons while the visible range comprises from about 400 to 700 millimicrons.

It is known that ultraviolet radiation is most productive of the enumerated undesirable photochemical effects. In order to eliminate at least in part some of the above-mentioned objectionable photochemical effects amber glass has been utilized heretofore to absorb at least a portion of the ultraviolet radiation of the atmosphere. The amber glass has served to furnish some degree of "light protection" to the contained products. The term "light protection" is commonly applied to glasses adapted to protect against ultraviolet as well as visible radiation and, as used herein, this and like terms are intended to apply to protection against all such radiation which produces undesirable photochemical effects.

As defined in U.S. Pharmacopoeia, volume 12, pages 6 and 7, a "light-resistant container" is one which is opaque or designed to prevent photochemical deterioration of the contents beyond the official limits of strength, quality or purity under customary conditions of handling, storage, shipment or sale. The "light-resistant container" as defined therein shall be composed of a substance which in a thickness of two millimeters shall not transmit more than 10 percent of the incident radiation of any wave length between 2900 and 4500 Angstrom units (290 and 450 millimicrons).

A desirable feature of glass bottles and other glass containers is their transparency permitting the packaged products to be visually inspected. In order to provide protection against photochemical effects amber glass is used for some packaging such as beverage and pharmaceutical products where visibility of the contents is desired either for purposes of display or inspection, or for the detection of foreign particles, or for other purposes. However, the visibility through such amber glass is comparatively low. Thus, amber glass does not possess characteristics of transmitting a high level of visible light.

The instant application is a continuation-in-part of our prior application Serial No. 771,031, filed October 31, 1958, and now abandoned, which in turn, is a continuation-in-part of application Serial No. 659,179, filed May 14, 1957, and now abandoned, both of said prior applications being assigned to the assignee of the present invention.

Accordingly, it is an object of the present invention to provide a glass of much better visibility and which at the same time give adequate "light protection" equal to or greater than that of amber glass.

Another object of this invention is to provide glass compositions having green coloration which possess characteristics of high ultraviolet ray absorption and visible ray transmittance.

Another object of this invention is to provide light-transmitting green glasses having widely varied common base compositions, the glasses including a prescribed amount of hexavalent chromium to impart a high degree of ultraviolet ray absorption to the glass.

A further object of this invention is to provide yellow green or green glasses suitable for bottling beverages or containing foods which are commonly retained in emerald green glass and which new glasses will withstand increased exposure to sunlight and/or fluorescent light without deterioration of desirable properties of contained products.

The specific nature of this invention, as well as other objects and advantages thereof, will become apparent to those skilled in the art from the following detailed description taken in conjunction with the annexed sheet of drawings on which, by way of preferred example only, are illustrated the preferred embodiments of this invention.

The accompanying drawing illustrates in comparative form "light protection" properties of several standard and ultraviolet absorbing glasses as specific embodiments of the present invention.

In accordance with the present invention there is produced green glass having a color appearance similar to emerald green, a visibility equal to that of emerald green and much greater than that of amber, permitting the examination of contents retained in containers made of such glass and having "light protection" vastly exceeding that of emerald green glass and similar to that of amber. Emerald green glass such as employed in bottling certain carbonated beverages generally is regarded as having C.I.E. colorimetric values consisting of the following for a typical 10.0 mm. specimen; 34.4% brightness, 66.4% purity and 555 millimicrons dominant wave length. Amber glass generally has distinctively different values which typically for a 2.0 mm. specimen are: 48.0% brightness, 78.8% purity and 579 millimicrons dominant wave length.

The ultraviolet absorption achieved by the present invention is due to the presence of hexavalent chromium in the glass also containing a minimal amount of iron as commercially melted. It is not necessary in practicing the present invention that any particular amount of iron be included in the composition. However, as is known in producing commercial melts of common glasses small amounts of iron are inherently present as a contaminant being carried into the glass with some of its major constituents such as silica sand.

Commercial glasses made in accordance with this invention are prepared by controlling both the batch constituents of the glass as prepared and the melting and fining conditions under which they are melted. This is obtained by an oxidizing atmosphere in the melter and/or the use of oxidizing agents in the glass batch as melted. The hexavalent chromium may be produced by employing alkali metal or alkaline earth chromate or dichromates in the batch composition. It has also been found that any other chromium containing glass-forming material might be similarly employed as the source of the chromium. An alkaline nitrate such as potassium nitrate ($KNO_3$) or sodium nitrate ($NaNO_3$) is employed in the batch to produce a prescribed amount of oxidant depending upon the particular composition and melting conditions to secure the hexavalent chromium in the end product. It is necessary in preparing the composition that both the chromium containing glass-forming material and the oxidant such as an alkaline nitrate be used together to ensure that at least a portion of the chromium either remains or is converted to the hexavalent state on melting and fining.

The chromium is added to the glass batch preferably either as potassium dichromate ($K_2Cr_2O_7$) or sodium dichromate ($Na_2Cr_2O_7.2H_2O$) although other chromates or chromites may similarly be employed. The potassium dichromate which is stable in air offers certain advantages in the production of the subject glasses over sodium dichromate which is deliquescent. In melting and refining of the glass batch wherein chromates or dichromates or mixtures thereof are utilized as the chromium containing material, at least a portion of the chromium is retained in the hexavalent state during melting and is also so retained in the final glass product.

The chromium containing materials employed in the glass batch may be comprised of chromium in its highest state of valence in the form of chromates and/or dichromates for securing the hexavalent chromium. In this case a major portion of the hexavalent chromium is reduced to the trivalent state in the melting furnace while a minor amount is retained in the hexavalent state in the final glass product.

In another procedure for practicing the present invention the chromium containing material may consist of a mixture of chromate or dichromate and chromite, wherein the heat-reacted product of the chromium containing materials consists of part hexavalent chromium oxide ($CrO_3$) and part trivalent chromium oxide ($Cr_2O_3$). In still another procedure the chromium containing material may be comprised entirely of trivalent chromium as in the case of utilizing iron chromate ($FeO.Cr_2O_3$) as a batch constituent. In this case an oxidant such as the alkaline nitrate is placed in the glass batch and oxidizing conditions within the melting furnace are utilized to convert at least a portion of the trivalent chromium oxide ($Cr_2O_3$) into hexavalent chromium oxide ($CrO_3$).

The hexavalent chromium is a powerful absorber of ultraviolet radiation and a less powerful absorber of visible radiation. Furthermore, it is practical to secure either by oxidation or retention of only a small portion of the chromium in the hexavalent state an amount of approximately 0.05% being adequate to absorb nearly 85% of the ultraviolet radiation and all radiations below about 440 millimicrons. The hexavalent chromium produces a slightly yellowing tendency in the glass which may be desirable for producing a yellow green glass for example. However, the addition of a small amount of copper oxide (CuO) tending to produce a bluish color will complement this yellowing tendency so that the glass resembles or closely approaches an emerald green color.

The conditions which have been pointed out above for obtaining an ultraviolet absorption glass as an end product are greatly affected by the melting and refining conditions of the glass. These conditions obviously vary considerably during the operation of a commercial open hearth type furnace such as universally used in the manufacture of glass bottles, jars, or other containers. The normal operating variations frequently result in a lack of satisfactory control of the state of oxidation of the chromium present in the glass and it is imperative that either the melting and fining conditions or the batch constituents or both be carefully controlled to secure a desired level of hexavalent chromium oxide in the final product.

The existence and amount of hexavalent chromium which is produced in a given glass composition such as emerald green, for example, is largely due to the atmosphere over the raw glass melt and the components of the batch utilized in the melting process. Control over the melting and thus the valence state of the chromium may be obtained by supplying oxygen into the batch from an oxygen bubbler disposed in the melting chamber for maintaining a slightly oxidizing atmosphere over the raw glass as melted. One form of apparatus and method for producing the subject ultraviolet absorbing green glass has been disclosed in the copending patent application of Joseph C. Hamilton, Serial No. 713,857, filed February 7, 1957, and now abandoned, entitled "Method of Producing Ultraviolet Absorbing Green Glass," which application is assigned to the same assignee as the present application. As pointed out in the referred to application conditions for obtaining ultraviolet radiation absorption glass in the melter are strongly affected by the melting conditions both as to atmosphere and constituents. Melting conditions vary considerably during the operation of a commercial open hearth furnace such as universally used in continuous tank manufacturing of molten glass of consistent quality for forming and end use demands in making bottles, jars or other containers. The referred to application of Hamilton provides method and means of eliminating melting variations and furnishes control over the hexavalent chromium oxide in the glass melt by an oxygen bubbler introducing oxygen into the glass during the melting.

As exemplary of the process disclosed in the above-identified application of Hamilton, tests have been run with glasses made within the composition range herein disclosed to determine the effect of the amount of hexavalent added chromium necessary to obtain complete absorption through a ¼ inch thick sample of glass and the effect of maintaining oxidizing conditions on the transmission of allowable light. The results of these tests show that transmissions at a wave length of 400 millimicrons vary from 4% to 6% when using .03 chromium oxide (expressed as $Cr_2O_3$, added as $K_2Cr_2O_7$), with 25 lbs. of niter per ton of sand and an oxygen-bubbler rate of .35 cubic feet per hour with refiner atmospheres ranging from neutral to 6% air. Transmission when .06% chromium oxide is used under the same conditions is not detectable (less than 0.1% transmission), or is reduced below any predetermined value.

With .04% chromium oxide (added as dichromate), the oxygen-bubbler was demonstrated to be effective in controlling the state of oxidation of the chromium, and the ultraviolet transmission. At a bubbler rate of .1 cubic foot per hour, the glass showed 3½ transmission at 400 millimicrons, while at a bubbler rate of .35 cubic foot per hour, the transmission at 400 millimicrons was only .5%. In the first case, the excess air in the refiner was 2% whereas in the second case it was 10%.

These test results are examples taken from a series thereof in which it was found that the variations in the rate of oxygen bubbling easily attainable in practice were sufficient to compensate for the variations in oxidizing or reducing conditions normally encountered in open hearth melting furnaces.

In the melting of such composition, whether or not bubblers are used, the melting temperatures range from 2700° F. to 2875° F. and the refining or conditioning temperatures range from 2000° F. to 2500° F.

Examples of glass batches which may be used in practicing our invention are as follows:

*Table I*

| Components | No. 1 | No. 2 | No. 3 |
|---|---|---|---|
| Sand | 40.6 | 40.6 | 40.6 |
| Lime | 10.4 | 10.4 | 10.4 |
| Nepheline Syenite | 3.67 | 3.67 | 6.5 |
| Soda Ash | 15.8 | 15.8 | 10.13 |
| Barytes | 0.56 | 0.56 | |
| Dehydrated Borax | | | 2.1 |
| Dolomite | | | 13.73 |
| Barium Carbonate | | | 0.58 |
| Fluorspar | 0.10 | 0.10 | |
| Potassium Dichromate | 0.23 | 0.23 | 0.23 |
| Niter | 0.50 | 0.50 | 0.50 |

Chemical analyses of the glass product produced from the above glass batches are as follows:

*Table II*

| Chemical Analyses | No. 1 | No. 2 | No. 3 |
|---|---|---|---|
| $SiO_2$ | 71.8 | 71.3 | 70.9 |
| $R_2O_3$ | 1.92 | 1.74 | 2.55 |
| CaO | 9.0 | 9.0 | 6.82 |
| MgO | 0.45 | 0.42 | 4.62 |
| BaO | 0.62 | 0.62 | 0.70 |
| $Na_2O$ | 15.5 | 16.1 | 11.6 |
| $K_2O$ | 0.394 | 0.418 | 0.485 |
| $B_2O_3$ | | | 2.3 |
| $Cr_2O_3$ | 0.21 | 0.22 | 0.22 |
| $CrO_3$ | 0.061 | 0.063 | 0.060 |
| CuO | | 0.07 | |
| $Fe_2O_3$ | 0.045 | 0.049 | 0.045 |
| Total | 100.000 | 100.000 | 100.000 |

The $R_2O_3$ in the analyses represents constituents such as $Al_2O_3$ and other related metallic oxides which are commonly grouped together under this heading for analytical purposes. It will be noted that the three glasses Nos. 1, 2 and 3 each contain a total chromium oxide content expressed as $Cr_2O_3$ of about 0.22% and about one-third of the chromium oxide is present in the hexavalent state in an amount of about 0.061% to secure ultraviolet absorption. Glass No. 2 contains 0.07% CuO to mask the yellowing tendency of the hexavalent chromium to produce a slightly deeper shade of green glass. Glass No. 3 contains 2.3% boric oxide ($B_2O_3$) furnishing an example of a modified borosilicate g which also provides ultraviolet absorption characteri: in having hexavalent chromium present.

Other examples of suitable glass compositions wl may be utilized are those having the following theoret analyses (in percentage by weight):

*Table III*

| Components | No. 4 | No. 5 | No. 6 | Nc |
|---|---|---|---|---|
| $SiO_2$ | 70.2 | 68.6 | 66.7 | 63 |
| $Al_2O_3$ | 3.2 | 5.0 | 7.0 | 9 |
| $Fe_2O_3$ | 0.12 | 0.1 | 0.1 | 0 |
| CaO | 9.7 | 9.3 | 9.0 | 8 |
| MgO | 0.2 | 0.1 | 0.1 | 0. |
| $Na_2O$ | 14.5 | 14.8 | 15.0 | 15. |
| $K_2O$ | 1.9 | 2.0 | 2.0 | 2. |
| $Cr_2O_3$ (total) | 0.137 | 0.137 | 0.137 | 0. |
| CoO | 0.0050 | 0.0050 | 0.0050 | 0. |

It will be noted that the alumina ($Al_2O_3$) con of such glasses are substantially larger than those of amples 1–3 above. Also, the total $R_2O_3$ analysi: greater, even though the total $Cr_2O_3$ content has b lowered. The high alumina content is due prima to the utilization of high $Al_2O_3$ sand, known in the tr as "Del Monte Sand," having the following typ analysis:

Percent by we $SiO_2$ _____

$Al_2O_3$ _____

$Fe_2O_3$ _____ 0.07 to (

CaO _____

$Na_2O$ _____

$K_2O$ _____

Table IV illustrates a comparison of so-called "ul sorb" glasses "A" through "E" inclusive as compa with conventional emerald green and amber glasses. standard emerald green and amber do not ordinarily c tain any hexavalent chromium ($CrO_3$) and only emerald green contains trivalent chromium ($Cr_2O_3$) an amount of 0.21% in the indicated analysis of a t cal melt. Each of the "Ultrasorb" glasses may be served to contain varied amounts of hexavalent cl mium ($CrO_3$) with each having relative ultraviolet absorption power.

*Table IV*

| | Emerald Green | Amber | "Ultrasorb" | | | | |
|---|---|---|---|---|---|---|---|
| | | | A | B | C | D | E |
| $SiO_2$ | 71.38 | 71.64 | 71.10 | 71.28 | 70.25 | 70.24 | |
| $Al_2O_3$ | 1.59 | 1.80 | 1.6 | 1.81 | 2.99 | 2.99 | |
| CaO | 9.56 | 11.30 | 9.0 | 9.72 | 9.88 | 9.88 | |
| MgO | .17 | .20 | 0.7 | .15 | 0.24 | 0.24 | |
| $Na_2O$ | 16.82 | 14.45 | 16.2 | 16.68 | 14.44 | 14.44 | |
| $K_2O$ | .09 | .40 | 0.4 | .14 | 1.96 | 1.96 | |
| BaO | | | 0.59 | | | | |
| CuO | | | 0.08 | | | | |
| $Cr_2O_3$ | .21 | | 0.22 | .14 | .14 | .14 | |
| $CrO_3$ | | | 0.063 | .047 | .030 | .020 | |
| $Fe_2O_3$ | .18 | .181 | 0.047 | .033 | .064 | .086 | |
| S | | .029 | | | | | |
| CoO | | | | | .006 | .004 | |
| Total | 100.00 | 100.000 | 100.000 | 100.000 | 100.000 | 100.000 | 10( |

C. I. E. COLORIMETRIC VALUES

| | | | | | | | |
|---|---|---|---|---|---|---|---|
| Thickness of specimen in mm | 10 | 2.0 | 10 | 10 | 10 | 10 | 1( |
| Percent Br.[1] | 34.4 | 48.0 | 24.5 | 51.0 | 26.0 | 30.8 | |
| Percent Pur.[2] | 66.4 | 78.8 | 87.0 | 85.5 | 71.8 | 67.0 | |
| D. W. L. (m$\mu$)[3] | 555 | 579 | 555 | 564 | 558 | 558 | |

[1] Percent Brightness.
[2] Percent Purity.
[3] Dominant wave length (millimicrons).

Curves of the percent transmittance through a two millimeter specimen of wave lengths in the range of from 300 to 500 millimicrons are shown on the accompanying graph. With 400 millimicrons considered to be generally the line of distinction between ultraviolet and visible violet rays, it can be readily observed that emerald green glass is capable of absorbing only a small amount of ultraviolet below about 320 millimicrons and that it transmits a very large portion of the ultraviolet between 320 and 440 millimicrons. Amber glass on the other hand which is very dense and approaches opaqueness in any appreciable thickness absorbs nearly all of the ultraviolet and also a considerable amount of the visible wave lengths between 400 and 500 millimicrons as can be seen by the curve for amber on the bottom of the graph.

In between these extremes reside the subject "Ultrasorb" glass melts wherein the hexavalent chromium oxides ($CrO_3$) percentage range from 0.005 to 0.065% by weight. The minimum amount of hexavalent chromium of 0.005% transmits only a small portion of the total ultraviolet and it may also be observed that the relative amount of ultraviolet transmission is directly correlative to the relative amount of hexavalent chromium oxide present in the glass. It can also be seen how the subject glasses achieve very appreciable absorption of the ultraviolet with a high rate of transmission of the visible light in the range of from 440 millimicrons and above.

The properties of the "Ultrasorb" absorbing green glasses which have been found to be particularly desirable are the following:

(a) The visibility similar to that of emerald green and much greater than that of amber glass.

(b) "Light protection" vastly exceeding that of emerald green and similar to that of amber.

(c) Batch costs only slightly exceeding that of emerald green on the basis of per ton of glass made.

(d) The ultraviolet absorbing property is essentially due to hexavalent chromium in the glass which is obtained by using an oxidizing atmosphere in the melter, chromates or dichromates or chromite as the source of chromium, and niter or saltpeter as an oxidant in the batch.

(e) A total chromium oxide content of less than 0.5% by weight and generally from about 0.1 to 0.3% total chromium oxides of which about 0.005 to 0.070% exists as hexavalent chromium oxide ($CrO_3$) provides a glass having very substantial ultraviolet absorbing features. Utilizing less than 0.2% and preferably about 0.08% copper oxide (CuO) in the glass produces a near emerald green color. When the copper is omitted the glass has a more yellowish green hue due to the yellow-orangish tendency of the hexavalent chromium, the trivalent chromium oxide ($Cr_2O_3$) producing the green. Cobalt oxide (CoO) may also be used to eliminate the yellowish cast to produce an emerald green. The cobalt oxide may be present in an amount less than 0.01% CoO preferably ranging from 0.002 to 0.008% CoO and about 0.004% CoO for near emerald green glasses containing 0.008 to 0.030% $CrO_3$, for example.

The new glasses may contain by weight 60–75% $SiO_2$; 0.1–10.0% $R_2O_3$ of which the major portion is $Al_2O_3$; 6–12% CaO; 0–6% MgO; 0–1% BaO; 10–21% alkali metal oxides; 0–5% $B_2O_3$; 0.020–0.20% $Fe_2O_3$; and chromium oxide present in both the trivalent and hexavalent states usually in a total amount of less than 0.5%. It has been found preferable to employ a total chromium oxide content of 0.1–0.3% with about 0.005–0.070% $CrO_3$ to secure in an economical manner the very considerable absorption of ultraviolet rays. A higher magnesium oxide content glass may be produced by using a magnesium containing component in the batch such as dolomitic limestone rather than lime. Comparatively low silica-high alumina glasses having excellent absorption characteristics can be prepared from high $Al_2O_3$ content sands. Furthermore, it is possible to produce modified borosilicate glasses by employing from about 1–5% $B_2O_3$ in the glass. In order to produce the green glass having a coloration near emerald green the copper oxide (CuO) may be included in an amount of less than 0.2% by weight. In melting the subject glasses it is necessary to maintain an oxidizing atmosphere in the melter with preferably a small amount of niter or saltpeter in the batch sufficient to oxidize a portion of the $Cr_2O_3$ to the hexavalent state $CrO_3$.

The preferred compositions of the present invention can be summarized as follows:

Table V

| Components: | Percent by weight |
| --- | --- |
| $SiO_2$ | 60–75 |
| $R_2O_3$ (total) | 0.1–10.0 |
| $Al_2O_3$ | 0.1–9.5 |
| $Fe_2O_3$ | 0.020–0.20 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ (total) | 0.1–0.3 |
| $CrO_3$ | 0.005–0.070 |
| CoO | 0.002–0.008 |

The C.I.E. colorimetric values are based upon the I.C.I. chromaticity diagram. C.I.E. refers to the First International Commission of Illumination and the diagram from which the values are taken defines color in terms of mixtures of theoretical colored lights. The C.I.E. system makes possible the exact specification of colors by means of a "color map." The C.I.E. system of color notation specifies the color of glasses in terms of brightness, purity and dominant wave length. "Brightness" which is usually expressed in terms of percentage is the amount of visual response to a normal observer to the radiation emergent from a transparent object relative to the response in this observer to the radiation incident upon the object. Thus, brightness may be briefly termed the lightness of color of an object. "Purity" which is also normally expressed in terms of percentage is a measure of the monochromaticness of a color with monochromatic light having purity of 100%. By diluting the monochromatic radiation with white light made up of all wave lengths, we thereby dilute the color and reduce purity. "Dominant wave length," usually expressed in milimicrons ($m\mu$), is the wave length of monochromatic light appearing to the eye to have the same hue as the mixed light actually encountered.

Various modifications may be resorted to within the spirit and scope of the appended claims.

1. An ultraviolet radiation absorbing green glass composition comprising essentially by weight 60 to 75% $SiO_2$; 0.1 to 9.5% $Al_2O_3$; 6 to 12% CaO; 0 to 6% MgO; 0 to 1% BaO; 0 to 5% $B_2O_3$; 10 to 21% alkali metal oxides; including less than about 0.3% $Fe_2O_3$; and less than about 0.3% total chromium oxides present as both trivalent chromium oxide ($Cr_2O_3$) and hexavalent chromium oxide ($CrO_3$), the latter ranging from about 0.005 to 0.070%.

2. An ultraviolet radiation absorbing green glass composition comprising essentially by weight 60 to 75% $SiO_2$; 0.1 to 9.5% $Al_2O_3$; 6 to 12% CaO; 0 to 6% MgO; 0 to 1% BaO; 0 to 5% $B_2O_3$; 10 to 21% alkali metal oxides; 0.02 to 0.20% $Fe_2O_3$; and about 0.10 to 0.30 total chromium oxides including about 0.005 to 0.070% hexavalent chromium oxide, said composition having C.I.E. colorimetric values for 10 mm. thickness of about 25 to 52% brightness, 60 to 87% purity and 554 to 565 millimicrons dominant wave length.

3. An ultraviolet radiation absorbing green glass composition consisting essentially of the following ingredients:

| Ingredients: | Percent by weight |
|---|---|
| $SiO_2$ | 60–75 |
| $R_2O_3$ (total) | 0.1–10.0 |
| $Al_2O_3$ | 0.1–9.5 |
| $Fe_2O_3$ | 0.020–0.20 |
| CaO | 6–12 |
| BaO | 0–1.0 |
| $B_2O_3$ | 0–5 |
| MgO | 0–6 |
| $Na_2O$ | 10–20 |
| $K_2O$ | 0–1 |
| $Cr_2O_3$ (total) | 0.1–0.3 |
| $CrO_3$ | 0.005–0.070 |
| CoO | 0.002–0.008 |

References Cited in the file of this patent
UNITED STATES PATENTS
2,699,399     Armistead _____ Jan. 11, 1955

OTHER REFERENCES

The Glass Industry (Chemistry of Colored Glass April 1937, page 117.

Handbook of Glass Manufacture by Tooley (1953), page 250, Table IXB-VIII.